US008711162B2

(12) United States Patent
Kim et al.

(10) Patent No.: US 8,711,162 B2
(45) Date of Patent: Apr. 29, 2014

(54) ARBITRATION CIRCUIT TO ARBITRATE CONFLICT BETWEEN READ/WRITE COMMAND AND SCAN COMMAND AND DISPLAY DRIVER INTEGRATED CIRCUIT HAVING THE SAME

(75) Inventors: Wan-jung Kim, Suwon-si (KR); Chan-ho Lee, Hwaseong-si (KR); Tae-hyoung Kim, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1088 days.

(21) Appl. No.: 12/686,508

(22) Filed: Jan. 13, 2010

(65) Prior Publication Data

US 2010/0177106 A1 Jul. 15, 2010

(30) Foreign Application Priority Data

Jan. 13, 2009 (KR) .......................... 10-2009-002708

(51) Int. Cl.
*G09G 5/39* (2006.01)
*G06F 15/167* (2006.01)

(52) U.S. Cl.
USPC .......................................... 345/531; 345/541

(58) Field of Classification Search
USPC ........................... 345/531, 204, 205, 98, 541
See application file for complete search history.

(56) References Cited

U.S. PATENT DOCUMENTS 6,674,423 B2 * 1/2004 Isozaki ......................... 345/100

FOREIGN PATENT DOCUMENTS

| | | |
|---|---|---|
| JP | 10-282938 | 10/1998 |
| JP | 2005-275419 | 10/2005 |
| JP | 2008-046394 | 2/2008 |

* cited by examiner

*Primary Examiner* — Hau Nguyen
(74) *Attorney, Agent, or Firm* — Stanzione & Kim, LLP

(57) ABSTRACT

An arbitration circuit to arbitrate an issue between a read/write command and a scan command and a display driver integrated circuit including the arbitration circuit. The arbitration circuit includes a latch unit having a first latch circuit that latches and outputs a first signal related to a scan command and a second latch circuit that latches and outputs a second signal related to a read/write command, wherein the latch unit resets outputs of the first latch circuit and/or the second latch circuit in response to a ready signal related to a memory operation, and a maintaining unit to receive outputs of the first latch circuit and the second latch circuit, to generate a first internal signal to activate a scanning operation and a second internal signal to activate a reading/writing operation, maintain the first internal signal and the second internal signal, and to selectively activate the first internal signal or the second internal signal by changing the state of at least one of the first internal signal and second internal signal in response to the reset operation.

19 Claims, 9 Drawing Sheets

ARBITRATION CIRCUIT TO ARBITRATE CONFLICT BETWEEN READ/WRITE COMMAND AND SCAN COMMAND AND DISPLAY DRIVER INTEGRATED CIRCUIT HAVING THE SAME

CROSS-REFERENCE TO RELATED APPLICATIONS

This application claims priority under 35 U.S.C. 119 from Korean Patent Application No. 10-2009-0002708, filed on Jan. 13, 2009, in the Korean Intellectual Property Office, the disclosure of which is incorporated herein in its entirety by reference.

BACKGROUND

1. Field of the Invention

The inventive concept relates to an arbitration circuit and a display driver integrated circuit, and more particularly, to an arbitration circuit to arbitrate a conflict between a read/write command and a scan command and a display driver integrated circuit including the arbitration circuit.

2. Description of the Related Art

In general, display devices in laptop computers and monitors are mainly liquid crystal devices (LCDs). An LCD includes a panel for forming an image, wherein the panel includes a plurality of pixels. The plurality of pixels are formed in an area where a plurality of scan lines that transmit gate selection signals cross a plurality of data lines that transmit gray scale data.

Display driver integrated circuits, which are used to drive display devices such as LCDs, may be a scan driving unit and a source driving unit integrated on one chip, wherein the scan driving unit is used to drive the plurality of scan lines and the source driving unit is used to drive the plurality of data lines. Also, small-sized display devices, such as included in small-sized PCs and mobile phones, may include a panel module for representing an image and a driving circuit for driving the panel included in the panel module.

In general, a display driver integrated circuit, in which a scan driving unit and a source driving unit are integrated, includes a memory for storing frame data. The display driver integrated circuit writes data into the memory, reads data from the memory, or scans data stored in the memory to transmit the scanned data to a panel by interfacing with an external microprocessor unit. In general, bit lines for data transferring during reading/writing in the memory and bit lines during scanning in the memory are shared with each other and thus when a read/write command and a scan command are provided at the same time, data may collide in the bit lines and thus a memory failure may occur.

Accordingly, in order to prevent a memory failure when a read/write command and a scan command are provided at the same time, in general, a read/write section and a scan section are separately secured and reading/writing and scanning are performed in corresponding sections. However, in the above method, even if a scan command is not actually provided, reading/writing may not be performed during a section secured for scanning and thus reading/writing speed may be decreased. Also, when a read/write command and a scan command overlap, a predetermined delaying operation for signals is performed and then the commands are executed in corresponding sections. However, the predetermined delaying operation is significantly affected by a change in pressure, voltage, and temperature (PVT) and thus is hard to control.

SUMMARY

The inventive concept provides an arbitration circuit having improved arbitration process for a read/write command and a scan command and a display driver integrated circuit including the arbitration circuit.

Additional aspects and utilities of the present general inventive concept will be set forth in part in the description which follows and, in part, will be obvious from the description, or may be learned by practice of the general inventive concept.

According to features and utilities of the inventive concept, there is provided an arbitration circuit including a latch unit including a first latch circuit that latches and outputs a first signal related to a scan command and a second latch circuit that latches and outputs a second signal related to a read/write command, wherein the latch unit resets outputs of the first latch circuit and/or the second latch circuit in response to a ready signal related to a memory operation, and a maintaining unit to receive outputs of the first latch circuit and the second latch circuit, to generate a first internal signal to activate a scanning operation and a second internal signal to activate a reading/writing operation, to maintain the first internal signal and the second internal signal, and to selectively activate the first internal signal or the second internal signal by changing the state of at least one of the first internal signal and second internal signal in response to the reset operation.

The first latch circuit may include a first flip-flop that receives the first signal, generate an output signal according to the first signal, and in which a reset operation thereof is controlled according to the ready signal and the first internal signal, and the second latch circuit may include a second flip-flop that receives the second signal, generate an output signal according to the second signal, and in which a reset operation thereof is controlled according to the ready signal and the second internal signal.

The maintaining unit may maintain the first internal signal activated and the second internal signal deactivated, and then deactivate the first internal signal and activate and output the second internal signal at the same time in response to the reset operation of the first latch circuit when the first signal and the second signal are sequentially provided and there is a section in which the first signal and the second signal overlap, and wherein the maintaining unit may maintains the second internal signal activated and the first internal signal deactivated, and then deactivate the second internal signal and activate and output the first internal signal at the same time in response to the reset operation of the second latch circuit when the second signal and the first signal are sequentially provided and there is a section in which the second signal and the first signal overlap.

The maintaining unit may include a first NAND operation unit to receive the output of the first latch circuit through a first input terminal thereof and performing a NAND operation, and a second NAND operation unit to receive the output of the second latch circuit through a first input terminal thereof, to receive the output of the first NAND operation unit through a second input terminal thereof, performing a NAND operation, and to provide the output thereof to a second input terminal of the first NAND operation unit.

The maintaining unit may further include a first inverter to receive and invert the output of the first NAND operation unit and to generate the first internal signal, and a second inverter to receive and invert the output of the second NAND operation unit and to generate the second internal signal.

The arbitration circuit may further include: an information signal generating unit to generate an information signal indicating a section of a scanning operation or a reading/writing operation of the memory in response to any one of the first internal signal and the second internal signal, a control signal generating unit to generate a control signal in which a clock is activated in correspondence to the activation of each of the first internal signal and the second internal signal and to control the scanning operation or the reading/writing operation of the memory to be performed, and a multiplexer to receive a scan address and a read/write address and to selectively output any one address in response to the information signal.

The arbitration circuit may further include at least one latch circuit to latch a command, an address, or data received from an external memory controller and to output the latched signal so as to be interlocked with the time for transmitting the first signal.

According to features and utilities of the inventive concept, there is also provided a display driver integrated circuit including a memory unit to store image data, a memory controller to control a scanning operation and reading/writing operation of the memory unit, and an arbitration circuit interposed between the memory unit and the memory controller to arbitrate a conflict between a scan command and a read/write command provided from the memory controller, to receive a ready signal comprising information related to an operation of the memory unit, to selectively activate and output a first internal signal to activate a scanning operation or a second internal signal to activate a reading/writing operation in response to the ready signal.

According to features and utilities of the inventive concept, there is also provided an electronic apparatus including a functional unit to perform a displaying operation to display an image on a screen thereof using data, and a driver integrated circuit to control the functional unit, and having a memory unit to store the data, a memory controller to control a scanning operation and a reading/writing operation of the memory unit, and an arbitration unit interposed between the memory unit and the memory controller to arbitrate a conflict between a scan command and a read/write command provided from the memory controller, to receive a ready signal comprising information related to an operation of the memory unit, to selectively activate and output a first internal signal to activate a scanning operation or a second internal signal to activate a reading/writing operation in response to the ready signal.

The functional unit may include a display panel having the screen to display an image according to the data scanned from the memory unit during the scanning operation.

The functional unit may include a display panel having the screen to display an image according to the data written in the memory unit during the read/write operation.

The arbitration unit may process the scan command and the read/write command to avoid an overlap between the scanning operation and the read/write operation of the memory unit, and one of the scanning operation and the read/write operation may not be interrupted according to one of the scan command and the read/write command.

The arbitration unit may hold the processing of one of the scan command and the read/write command such that the scanning operation and the read/write operation do not overlap in the memory unit.

The arbitration unit may delay the activation of the second internal signal until the scanning operation has been performed in the memory unit according to the first internal signal.

According to features and utilities of the inventive concept, there is also provided an arbitration unit usable with a driving unit having a memory unit and a memory controller in an electronic apparatus, including a latch unit to receive a first signal to perform one of a scanning operation and a read/write operation on the memory unit, and to receive a second signal to perform the other one of the scanning operation and the read/write operation on the memory unit during performing the one of the scanning operation and the read/write operation, and to delay processing of the second signal until the one of the scanning operation and the read/write operation of the memory unit has been finished according to the first signal.

According to features and utilities of the inventive concept, there is also provided an arbitration unit usable with a driving unit having a memory unit and a memory controller in an electronic apparatus, including a first unit to process a first signal to perform a scanning operation to scan data of the memory unit, and a second unit to prevent a second signal from being processed to perform a read/write operation to write data in the memory unit when the scanning operation is performed according to the first signal.

According to features and utilities of the inventive concept, there is also provided an driver IC unit usable with an electronic apparatus having a functional unit to display an image according to data, including a memory unit to store the data, and an arbitration unit to control the memory unit to scan the data of the memory unit in a scanning operation and to read/write the data in the memory unit in a read/write operation data, to process a first signal to perform one of the scanning operation and the read/write operation on the memory unit, and to delay processing of a second signal to perform the other one of the scanning operation and the read/write operation until the one of the scanning operation and the read/write operation has been finished according to the processed first signal.

According to features and utilities of the inventive concept, there is also provided a method of driving a driver IC unit usable with an electronic apparatus having a functional unit to display an image according to data, the method including storing the data in a memory unit, and controlling the memory unit to scan the data of the memory unit in a scanning operation and to read/write the data in the memory unit in a read/write operation data, processing a first signal to perform one of the scanning operation and the read/write operation on the memory unit, and delaying the processing of a second signal to perform the other one of the scanning operation and the read/write operation until the one of the scanning operation and the read/write operation has been finished according to the processed first signal.

According to features and utilities of the inventive concept, there is also provided a computer-readable medium to perform a method of driving a driver IC unit usable with an electronic apparatus having a functional unit to display an image according to data, the method including storing the data in a memory unit, and controlling the memory unit to scan the data of the memory unit in a scanning operation and to read/write the data in the memory unit in a read/write operation data, processing a first signal to perform one of the scanning operation and the read/write operation on the memory unit, and delaying the processing of a second signal to perform the other one of the scanning operation and the read/write operation until the one of the scanning operation and the read/write operation has been finished according to the processed first signal.

BRIEF DESCRIPTION OF THE DRAWINGS

The above and/or other aspects of the present general inventive concept will become apparent and more readily appreciated from the following description of the exemplary embodiments, taken in conjunction with the accompanying drawings, in which.

DETAILED DESCRIPTION OF THE EMBODIMENTS

Figure 1:
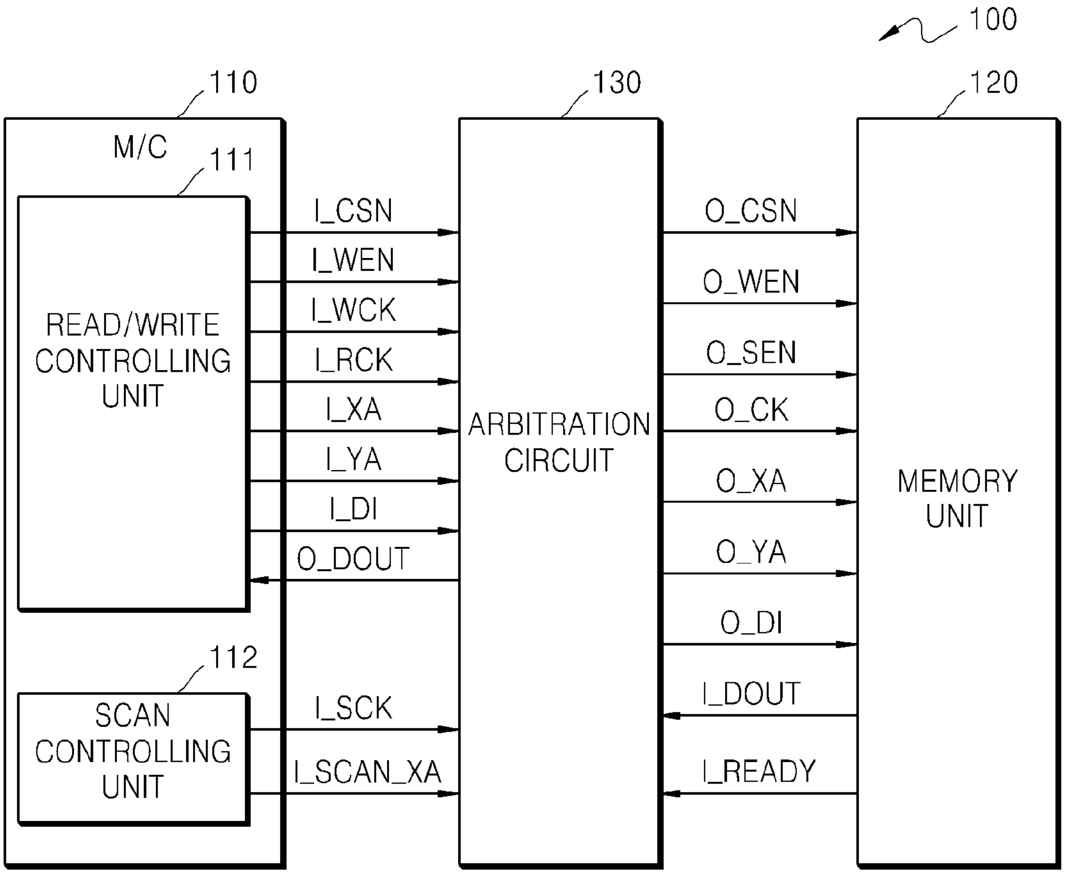
FIG. 1 is a block diagram of a display driver integrated circuit according to an embodiment of the inventive concept.

The exemplary embodiments of the inventive concept will be described in detail with reference to the accompanying drawings and description of the drawings so as to fully understand advantages and objectives of the inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Hereinafter, embodiment of the inventive concept will be described more fully with reference to the accompanying drawings. In the drawings, like reference numerals denote like elements.

FIG. 1 is a block diagram of a driver integrated circuit (IC) unit 100 according to an embodiment of the inventive concept. The driver IC unit 100 may be a display driver IC unit to control a memory unit to perform a read/write operation and a scanning operation. However, the present general inventive concept is not limited thereto. The driver IC unit 100 may be a controlling unit usable with a display apparatus to control a memory to store data and to display an image on a screen of a display panel using the date. Hereinafter, the driver IC unit is referred to as a display driver integrated circuit, as an example.

Referring to FIG. 1, the display driver integrated circuit 100 may include a memory controller (M/C) 110, a memory unit 120, and an arbitration circuit 130, wherein the M/C 110 is to control a memory scanning operation and a reading/writing operation for driving a display, the memory unit 120 is to perform a scanning operation for image data and a data reading/writing operation, in response to control of the M/C 110, and the arbitration circuit 130 is interposed between the M/C 110 and the memory unit 120 to arbitrate a conflict between a scan command and a read/write command provided from the M/C 110. The arbitration circuit 130 can also arbitrate an overlapping or collision between a scanning operation and a read/write operation according to the scan command and the read/write command.

The M/C 110 may include a read/write controlling unit 111 and a scan controlling unit 112. The read/write controlling unit 111 controls a reading/writing operation of the memory unit 120 and the scan controlling unit 112 controls a scanning operation of the memory unit 120. Accordingly, the read/write controlling unit 111 may output signals corresponding to various commands, addresses, and data to perform a reading/writing operation of the memory unit 120. The signals provided from the read/write controlling unit 111 may include a chip selection signal I_CSN to select a memory chip, for example, the memory unit 10, a signal I_WEN to indicate a read/write command, write and read clock signals I_WCK and I_RCK, row and column addresses I_XA and I_YA, and a data signal I_DI to be written in the memory unit 120. Also, output data O_DOUT indicates data read from the memory unit 120 and provided to the M/C 110 through the arbitration circuit 130. The scan controlling unit 112 may output a scan clock signal I_SCK and a scan address I_SCAN_XA to control a scanning operation of the memory unit 120.

Commands, addresses, and data related to a scanning operation or a reading/writing operation and output from the M/C 110 are provided to the arbitration circuit 130. The arbitration circuit 130 may receive and process the command and address corresponding to a scan command from the M/C 110 and provides the processed command and address to the memory unit 120. Also, the arbitration circuit 130 may receive and process the command and address corresponding to a read/write command from the M/C 110 and provides the processed command and address to the memory unit 120. The arbitration circuit 130 arbitrates conflict between the scan command and the read/write command and avoid overlapping of the scanning operation and the read/write operation, and provides signals corresponding to various commands, addresses, and data O_CSN, O_WEN, O_SEN, O_CK, O_XA, O_YA, and O_DI according to the result of arbitration to the memory unit 120 so as to prevent a scanning operation and a reading/writing operation from being performed at the same time in the memory unit 120. Furthermore, a data signal I_DOUT is data provided from the memory unit 120 to the arbitration circuit 130 and a ready signal I_READY is a signal having information indicating that a predetermined operation (for example, a scanning operation or a reading/writing operation) of the memory unit 120 has been completed and that the memory unit 120 waits for an operation command to perform a next operation thereof.

When a scan command and a read/write command are provided at the same time, the arbitration circuit 130 prevents a scanning operation and a reading/writing operation from being performed at the same time. Accordingly, when the scan command and the read/write command are provided at the same time, the arbitration circuit 130 activates an internal signal for any one of the scanning operation and the reading/ writing operation of the memory unit 120 and deactivates an internal signal for the other one of the scanning operation and the reading/writing operation of the memory unit 120. That is, the arbitration circuit 130 controls the memory unit 120 to perform the scanning operation or the reading/writing operation according to the activated internal signal. Then, when the operation is completed according to the corresponding internal signal, the arbitration circuit 130 controls activation and deactivation of the internal signals, in response to the ready signal I_READY provided from the memory unit 120. For example, in response to the ready signal I_READY, the arbitration circuit 130 controls the internal signal in an active state to be deactivated and the internal signal in a deactive state to be activated, and thus the scanning operation and the reading/writing operation are prevented from being performed at the same time in the memory unit 120.

An operation of the display driver integrated circuit 100 according to the current embodiment of the inventive concept is described below in more detail.

Figure 2:
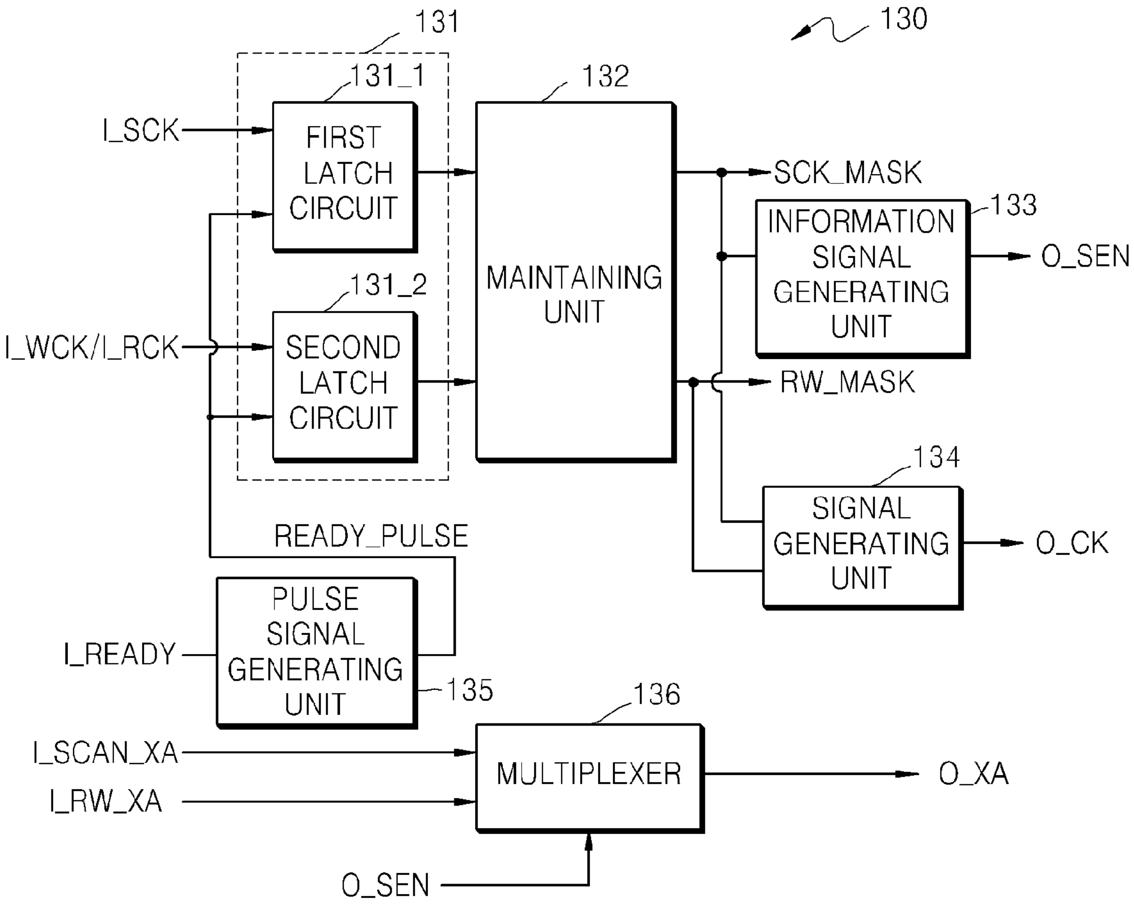
FIG. 2 is a block diagram illustrating an arbitration circuit of the display driver integrated circuit of FIG. 1.

FIG. 2 is a block diagram illustrating the arbitration circuit 130 of FIG. 1. Referring to FIGS. 1 and 2, the arbitration circuit 130 may include a latch unit 131 and a maintaining unit 132. The latch unit 131 may receive a scan clock signal I_SCK (hereinafter, referred to as a first clock signal) related to a scan command and a write/read clock signals I_WCK/I_RCK (hereinafter, referred to as a second clock signal) related to a write/read command and may latch the first clock signal I_SCK and the second clock signals I_WCK/I_RCK. The maintaining unit 132 may receive and maintain an output of the latch unit 131 regardless of whether an output of the latch unit 131 is changed. Also, the arbitration circuit 130 may further include an information signal generating unit 133 and a control signal generating unit 134. The information signal generating unit 133 generates an information signal O_SEN that indicates whether a section is for a scanning operation or a reading/writing operation of the memory unit 120 by receiving an output of the maintaining unit 132 and processing the received output. The control signal generating unit 134 generates a control signal O_CK that controls whether a scanning operation or a reading/writing operation is to be performed in response to an output of the maintaining unit 132. In addition, the arbitration circuit 130 may further includes a pulse signal generating unit 135 and a multiplexer 136. The pulse signal generating unit 135 generates a pulse signal in response to the ready signal I_READY provided from the memory unit 120 and the multiplexer 136 receives the scan address I_SCAN_XA and a read/write row address I_RW_XA and outputs any one address in response to the information signal O_SEN.

The latch unit 131 may include a first latch circuit 131_1 and a second latch circuit 131_2. The first latch circuit 131_1 latches and outputs the first clock signal I_SCK and the second latch circuit 131_2 latches and outputs the second clock signals I_WCK/I_RCK. The first latch circuit 131_1 may reset the output thereof in response to the ready signal I_READY provided from the memory unit 120 and may reset the output thereof in response to a pulse READY_PULSE generated by using the ready signal I_READY. Similarly, the second latch circuit 131_2 may reset the output thereof in response to the ready signal I_READY and may reset the output thereof in response to a pulse READY_PULSE generated by using the ready signal I_READY.

The maintaining unit 132 receives outputs of the first latch circuit 131_1 and the second latch circuit 131_2 and generates a first internal signal SCK_MASK and a second internal signal RW_MASK based on the received signals. The first internal signal SCK_MASK is used for a scanning operation of the memory unit 120. When the first internal signal SCK_MASK is activated, the scanning operation of the memory unit 120 is performed in response to the information signal O_SEN and the control signal O_CK. Also, the second internal signal RW_MASK is used for a reading/writing operation of the memory unit 120. When the second internal signal RW_MASK is activated, the reading/writing operation of the memory unit 120 is performed in response to the information signal O_SEN and the control signal O_CK.

When only the first clock signal I_SCK for a scanning operation is provided to the arbitration circuit 130, due to operations of the first latch circuit 131_1 and the maintaining unit 132 according to the scan clock I_SCK, only the first internal signal SCK_MASK is activated. The information signal generating unit 133 generates and provides the information signal O_SEN that indicates a section of a scanning operation (for example, logic low) to the memory unit 120 in response to the activated first internal signal SCK_MASK. Also, the control signal generating unit 134 generates the control signal O_CK in response to the activated first internal signal SCK_MASK and thus controls a scanning operation to be performed in the memory unit 120. In addition, the multiplexer 136 selectively outputs the scan address I_SCAN_XA in response to the information signal O_SEN as the output signal O_XA as an address for a scanning operation to the memory unit 120. Then, when the scanning operation of the memory unit 120 is completed, the pulse READY_PULSE is generated and the first latch circuit 131_1 is reset in response to the pulse READY_PULSE. And, the first internal signal SCK_MASK is deactivated due to the reset of the first latch circuit 131-1.

In addition, when only the second clock signal I_WCK/I_RCK for a reading/writing operation are provided to the arbitration circuit 130, due to operations of the second latch circuit 131_2 and the maintaining unit 132, only the second internal signal RW_MASK is activated. Also, the information signal generating unit 133 generates and provides the information signal O_SEN that indicates a section of a reading/writing operation (for example, logic high) to the memory unit 120 in response to the second internal signal RW_MASK. Since the control signal O_CK generated from the control signal generating unit 134 is provided to the memory unit 120, a reading/writing operation is performed in the memory unit 120. In addition, the multiplexer 136 selectively outputs the read/write row address I_RW_XA in response to the information signal O_SEN as the output signal O_XA as an address for a reading/writing operation to the memory unit 120. Then, when the reading/writing operation of the memory unit 120 is completed, the pulse READY_PULSE is generated and the second latch circuit 131_2 is reset in response to the pulse READY_PULSE. And, the second internal signal RW_MASK is deactivated due to the reset of the second latch circuit 131-2.

An operation of the arbitration circuit 130 when the first clock signal I_SCK and the second clock signals I_WCK/I_RCK are provided overlapping is as follows. For convenience of description, it is assumed that the first clock signal I_SCK is first provided and then the second clock signals I_WCK/I_RCK are provided.

When the first clock signal I_SCK is provided, the maintaining unit 132 receives an output of the first latch circuit 131_1 (for example, logic high) and an output of the second latch circuit 131_2 (for example, logic low), thereby activating the first internal signal SCK_MASK and maintaining the second internal signal RW_MASK in a deactivate state. According to the first internal signal SCK_MASK and the second internal signal RW_MASK, a scanning operation for the memory unit 120 is to be performed.

Then, when the second clock signal I_WCK/I_RCK is provided, the output of the second latch circuit 131_2 is changed (for example, changed to logic high). The maintaining unit 132 maintains the second internal signal RW_MASK in the deactivated state regardless of a change in the output of the second latch circuit 131_2.

Then, when a scanning operation for the memory unit 120 is completed, the pulse READY_PULSE is provided to the latch unit 131. The output of the first latch circuit 131_1 or the second latch circuit 131_2 is reset in response to the pulse READY_PULSE. In the current embodiment, the output of the first latch circuit 131_1 may be reset. Although not illustrated in FIG. 2, a circuit to reset any one latch circuit from among the first latch circuit 131_1 and the second latch circuit 131_2 in response to the pulse READY_PULSE may be further included in the latch unit 131.

When the output of the first latch circuit 131_1 is reset, the first internal signal SCK_MASK is deactivated. The maintaining unit 132 performs a predetermined operation (for example, a NAND operation) using the first internal signal SCK_MASK and the second internal signal RW_MASK and, according to the change of the level of the first internal signal SCK_MASK, activates the second internal signal RW_MASK. Accordingly, although the first clock signal I_SCK and the second clock signals I_WCK/I_RCK overlap each other, the first internal signal SCK_MASK and the second internal signal RW_MASK are selectively activated without simultaneously being activated and thus a scanning operation and a reading/writing operation are prevented from being performed at the same time in the memory unit 120.

An operation of the arbitration circuit 130 is described below in more detail with reference to FIG. 3.

Figure 3:
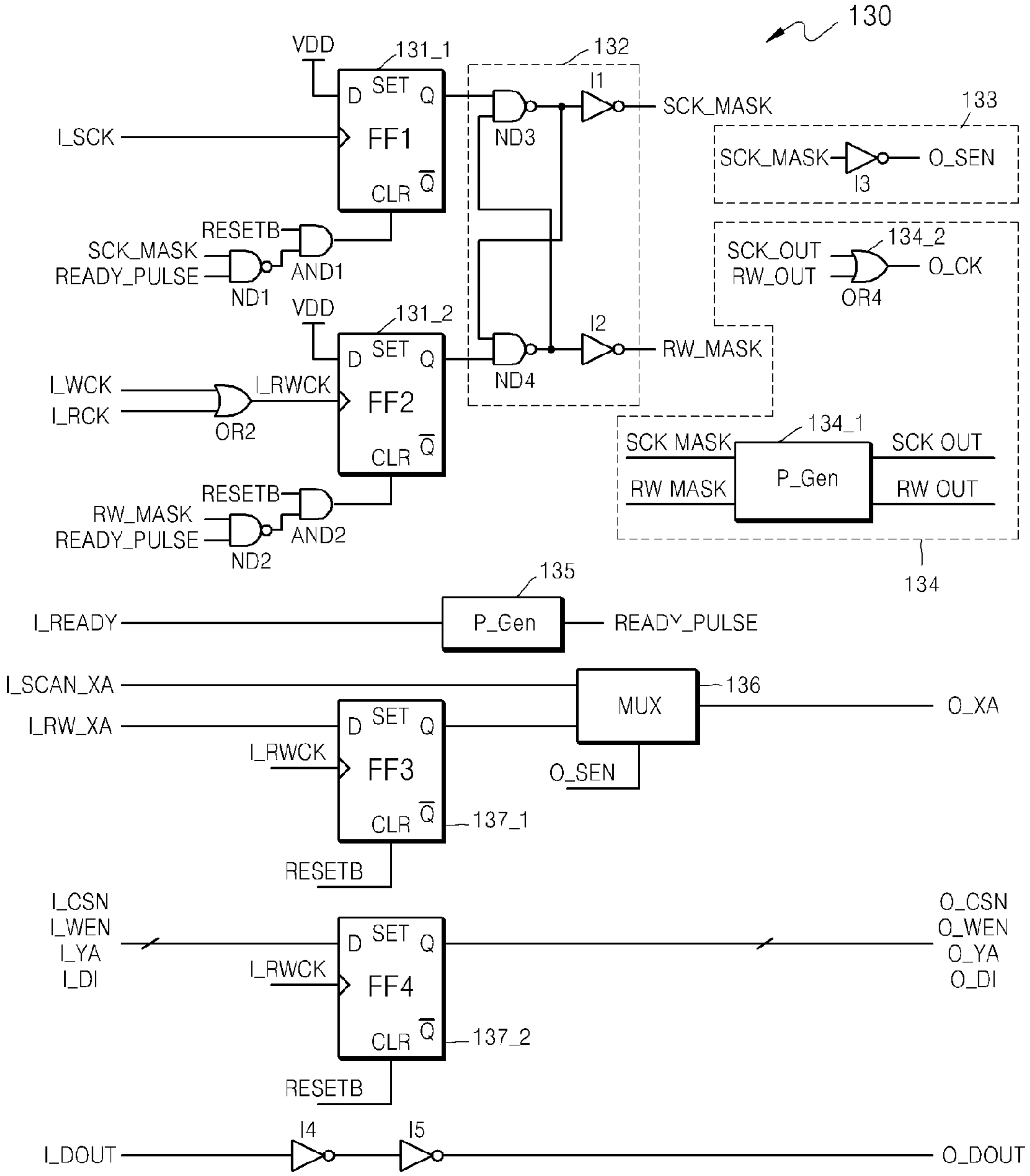
FIG. 3 is a circuit diagram illustrating the arbitration circuit of FIG. 2.

FIG. 3 is a circuit diagram illustrating the arbitration circuit 130 of FIG. 2. Referring to FIGS. 1, 2, and 3, the arbitration circuit 130 may include the first latch circuit 131_1 and the second latch circuit 1312 as latch units. The first latch circuit 131_1 and the second latch circuit 131_2 may each include one or more logic circuits, for example, a flip-flop.

For example, the first latch circuit 131_1 includes a logic circuit element, for example, a first flip-flop FF1 that receives the first clock signal I_SCK, which is related to a scan command. The first flip-flop FF1 performs a reset operation based on the first internal signal SCK_MASK. The first latch circuit 131_1 may further include a first NAND gate ND1 and a first AND gate AND1. The first NAND gate ND1 performs a NAND operation using the first internal signal SCK_MASK and the pulse READY_PULSE, and the first AND gate AND1 performs an AND operation using the output of the first NAND gate ND1 and a predetermined reset signal RESETB and outputs the result of the AND operation. The first flip-flop FF1 may perform a reset operation in response to the output of the first AND gate AND1.

The predetermined reset signal RESETB may be input from the memory controller 110 or a user to periodically or randomly perform the reset operation. It is possible that the arbitration circuit 130 may include a circuit element to generate the reset signal RESETB periodically or randomly, so that the reset operation can be performed in a predetermined manner or periodically or randomly.

Also, the second latch circuit 131_2 includes a logic circuit element, for example, a second flip-flop FF2 that receives the second clock signals I_WCK/I_RCK, which are related to a write/read command, and, for example, receives the write or read clock signal I_WCK or I_RCK respectively related to a write command or a read command, respectively through a first OR gate OR1. In addition, the second flip-flop FF2 performs a reset operation based on the second internal signal RW_MASK and accordingly the second latch circuit 131_2 may further include a second NAND gate ND2 and a second AND gate AND2. The second NAND gate ND2 performs an NAND operation using the second internal signal RW_MASK and the pulse READY_PULSE and the second AND gate AND2 performs an AND operation using the output of the second NAND gate ND2 and the predetermined reset signal RESETB and outputs the result of the AND operation. The second flip-flop FF2 may perform a reset operation in response to the output of the second AND gate AND2.

The outputs of the first flip-flop FF1 and the second flip-flop FF2 generated as described above are provided to the maintaining unit 132. The maintaining unit 132 may includes one or more logic circuit elements, for example, at least one NAND gate and at least one inverter. For example, the maintaining unit 132 may include a third NAND gate ND3 and a fourth NAND gate ND4. The third NAND gate ND3 receives the output of the first flip-flop FF1 and the fourth NAND gate ND4 receives the output of the second flip-flop FF2. An output of the third NAND gate ND3 is provided to one input terminal of the fourth NAND gate ND4 and an output of the fourth NAND gate ND4 is provided to one input terminal of the third NAND gate ND3. Also, the maintaining unit 132 may further include a first inverter I1 and a second inverter I2. The first inverter I1 receives and inverts the output of the third NAND gate ND3 and generates the first internal signal SCK_MASK, and the second inverter I2 receives and inverts the output of the fourth NAND gate ND4 and generates the second internal signal RW_MASK.

The information signal generating unit 133 generates the information signal O_SEN, provides the generated information signal O_SEN to the memory unit 120, and may include a third inverter I3, wherein the third inverter I3 inverts the first internal signal SCK_MASK to generate the inverted first internal signal SCK_MASK as the information signal O_SEN. The control signal generating unit 134 generates the control signal O_CK to control a scanning operation and a reading/writing operation of the memory unit 120, and may include a first pulse generating unit 134_1 and a second OR gate OR2. The first pulse generating unit 134_1 receives the first internal signal SCK_MASK and the second internal signal RW_MASK and generates pulses SCK_OUT and RW_OUT accordingly. The second OR gate performs an OR operation using the pulses SCK_OUT and RW_OUT generated from the first pulse generating unit 134_1 to generate the control signal O_CK.

The arbitration circuit 130 may further include a second pulse generating unit 135 to generate the pulse READY_PULSE in response to the ready signal I_READY provided from the memory unit 120. The pulse READY_PULSE is provided to the latch unit 131 for reset operations of the first flip-flop FF1 and the second flip-flop FF2. The multiplexer 136 receives the scan address I_SCAN_XA and the read/write row address I_RW_XA and selectively outputs any one address from among the received addresses in response to the information signal O_SEN.

In order to provide signals corresponding to the commands, addresses, and data that are provided to the arbitration circuit 130 to the memory unit 120, time for transmitting the signals to the memory unit 120 may be interlocked with each other. Accordingly, the arbitration circuit 130 may include another latch circuit and/or inverter. A third flip-flop FF3 is illustrated as the at least one latch circuit and is a circuit to latch and output the read/write row address I_RW_XA. A clock terminal of the second flip-flop FF2 and a clock terminal of the third flip-flop FF3 may be provided with the same clock signal I_RWCK.

Also, a latch operation using flip-flops may be further performed for other commands, addresses, and data that may be provided to the arbitration circuit 130. For example, various signals I_CSN, I_WEN, I_YA, and I_DI are provided to an input terminal of a fourth flip-flop FF4. In FIG. 3, one fourth flip-flop FF4 is illustrated. However, a plurality of flip-flops for receiving each of the various signals I_CSN, I_WEN, I_YA, and I_DI may be included in the arbitration circuit 130. In addition, the output data I_DOUT provided from the memory unit 120 may be provided to an external memory controller through predetermined inverters I4 and I5 in the arbitration circuit 130.

The arbitration circuit 130 illustrated in FIG. 3 is in an initial state by a reset operation. In the initial state, outputs Q of the first flip-flop FF1 and the second flip-flop FF2 have logic low values since the reset signal RESETB is applied thereto. Accordingly, both first internal signal SCK_MASK and second internal signal RW_MASK are deactivated and thus have logic low values. Also, the information signal O_SEN has a logic high value, and the control signal O_CK is deactivated and has a logic low value. In addition, the output address O_XA output from the multiplexer 136 is the read/write row address I_RW_XA and remaining outputs of the arbitration circuit 130 have initial values.

Then, when a memory operation is performed, the arbitration circuit 130 is operated and thus processes received signals so as to generate output signals. An operation of the arbitration circuit 130 may be divided into cases when a read/write command is received, when a scan command is received, and when a scan command is received and then a read/write command is received to overlap the scan command, and when a read/write command is received and then a scan command is received to overlap the read/write command. Operations of the arbitration circuit 130 in the above cases are described with reference to FIGS. 4 through 7.

Figure 4:
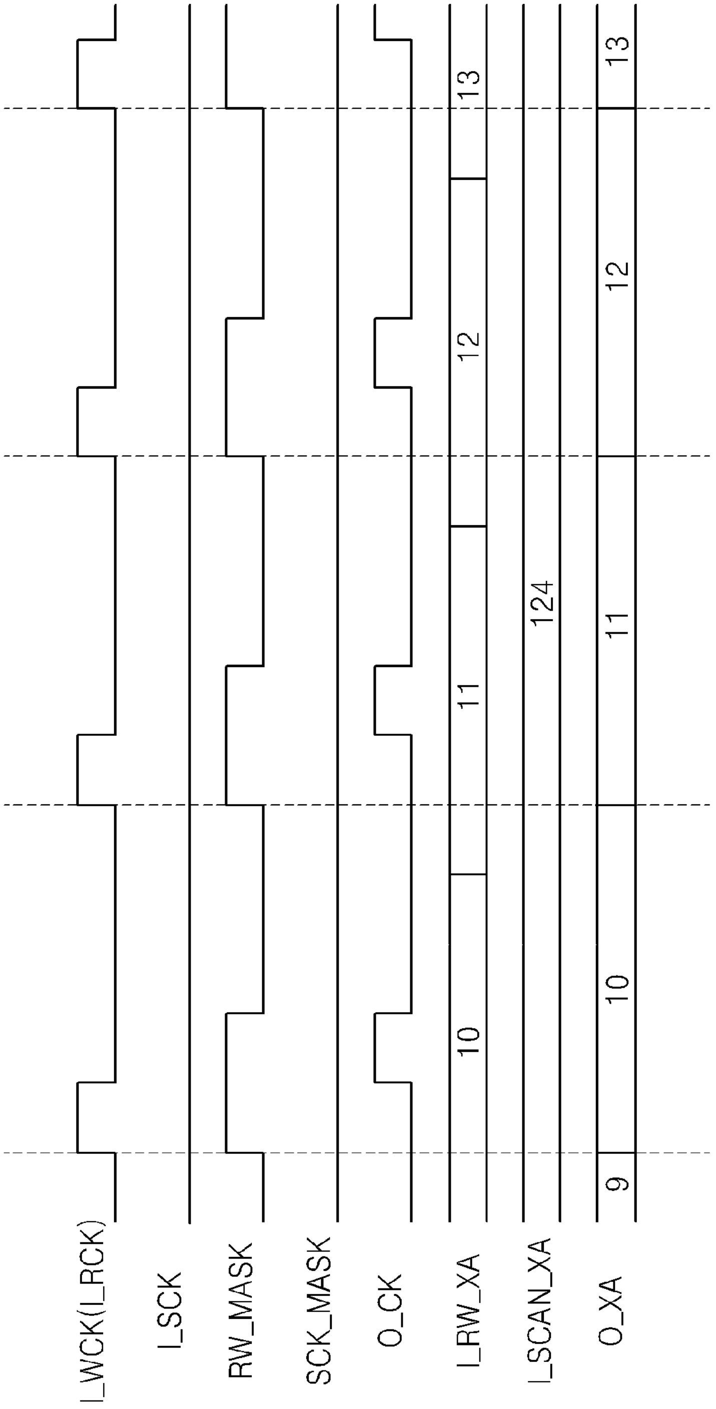
FIG. 4 is a waveform illustrating an operation of the arbitration circuit of FIG. 3 when a read/write command is received.

FIG. 4 is a waveform illustrating an operation of the arbitration circuit 130 when a read/write command is received. The deactivated first clock signal I_SCK and the pulse-form second clock signals I_WCK/I_RCK are provided to the arbitration circuit 130 according to the read/write command.

According to the pulse of the second clock signals I_WCK/I_RCK, the output Q of the second flip-flop FF2 is changed from logic low to logic high. Accordingly, logic high signals are provided to two input terminals of the fourth NAND gate ND4 and thus the fourth NAND gate ND4 outputs a logic low signal. The second inverter I2 receives the output of the fourth NAND gate ND4, inverts the received output of the fourth NAND gate ND4, and outputs the inverted output of the fourth NAND gate ND4. Accordingly, the second internal signal RW_MASK, which is the output of the second inverter I2, is changed to logic high as an activated second internal signal. The maintaining unit 132 maintains the second internal signal RW_MASK logic high.

The control signal generating unit 134 receives the activated second internal signal RW_MASK, performs a predetermined delay operation (for securing a setup margin) and a pulse generating operation on the received second internal signal RW_MASK, and generates the control signal O_CK as illustrated in FIG. 4. Also, since the first internal signal SCK_MASK maintains logic low, the information signal O_SEN has a logic high value and accordingly, the memory unit 120 may perform a reading/writing operation. As a memory reading/writing operation is performed, the read/write row address I_RW_XA gradually increases and the multiplexer 136 outputs the read/write row address I_RW_XA as the output address O_XA thereof.

When the operation of the write/read on the memory unit 120 is completed, the memory unit 120 provides the ready signal I_READY, which indicates that the operation has been completed and/or another operation can be performed as a next operation, to the arbitration circuit 130. Since the pulse READY_PULSE, which is based on the ready signal I_READY, is provided to the second flip-flop FF2, the output Q of the second flip-flop FF2 is reset. When the output of the second flip-flop FF2 is reset, the second internal signal RW_MASK is changed to logic low and the control signal O_CK is also changed to logic low. According to the operations above, a reading/writing operation in one cycle is completed.

The read/write row address I_RW_XA may be 10, 11, 12, and 13 in response to each read/write operation, and then the output address O_XA is generated as 9, 10, 11, 12, and 13 according to the corresponding address 10, 11, 12, and 13, for example. The scan address I_SCAN_XA of, for example, 124, may not be generated or replaced with other scan address.

Figure 5:
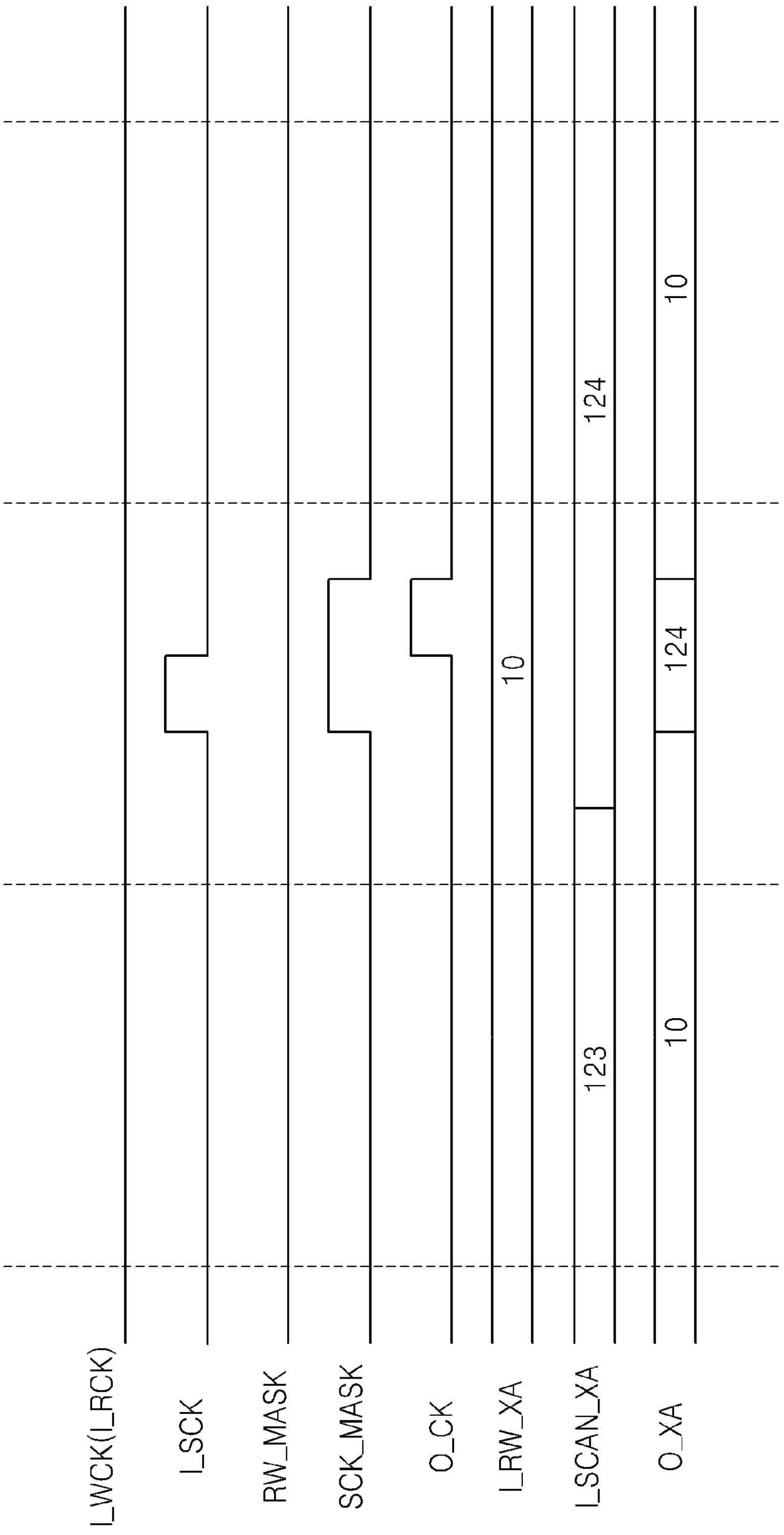
FIG. 5 is a waveform illustrating an operation of the arbitration circuit of FIG. 3 when a scan command is received.

FIG. 5 is a waveform illustrating an operation of the arbitration circuit 130 when a scan command is received. The pulse-form first clock signal I_SCK and the deactivated second clock signals I_WCK/I_RCK are provided to the arbitration circuit 130 according to the scan command.

According to the pulse of the first clock signal I_SCK, the output Q of the first flip-flop FF1 is changed from logic low to logic high and accordingly, the first internal signal SCK_MASK is changed to logic high. Also, the second internal signal RW_MASK maintains logic low. In addition, according to the first internal signal SCK_MASK changing logic levels, the information signal O_SEN has a logic low value and accordingly, the memory unit 120 may perform a scanning operation. In response to the activated first internal signal SCK_MASK, the control signal O_CK is as illustrated in FIG. 5 and the multiplexer 136 selectively outputs the scan address I_SCAN_XA as the output address O_XA.

The memory unit 120 performs a scanning operation in response to the information signal O_SEN and the control signal O_CK and provides the ready signal I_READY to the arbitration circuit 130 after the scanning operation is completed. Also, since the pulse READY_PULSE, which is based on the ready signal I_READY, is provided to the first flip-flop FF1, the output Q of the first flip-flop FF1 is reset. When the output of the first flip-flop FF1 is reset, the first internal signal SCK_MASK is changed to logic low and the control signal O_CK is also changed to logic low. According to the operations above, a scanning operation in one cycle is completed.

The scan address I_SCAN_XA may be 123 and 124 in response to each scanning operation, and then the output address O_XA is generated as 124 according to the corresponding address 124, for example. The read/write address I_RW_XA of, for example, 10, may not be generated or not replaced with other address.

Figure 6:
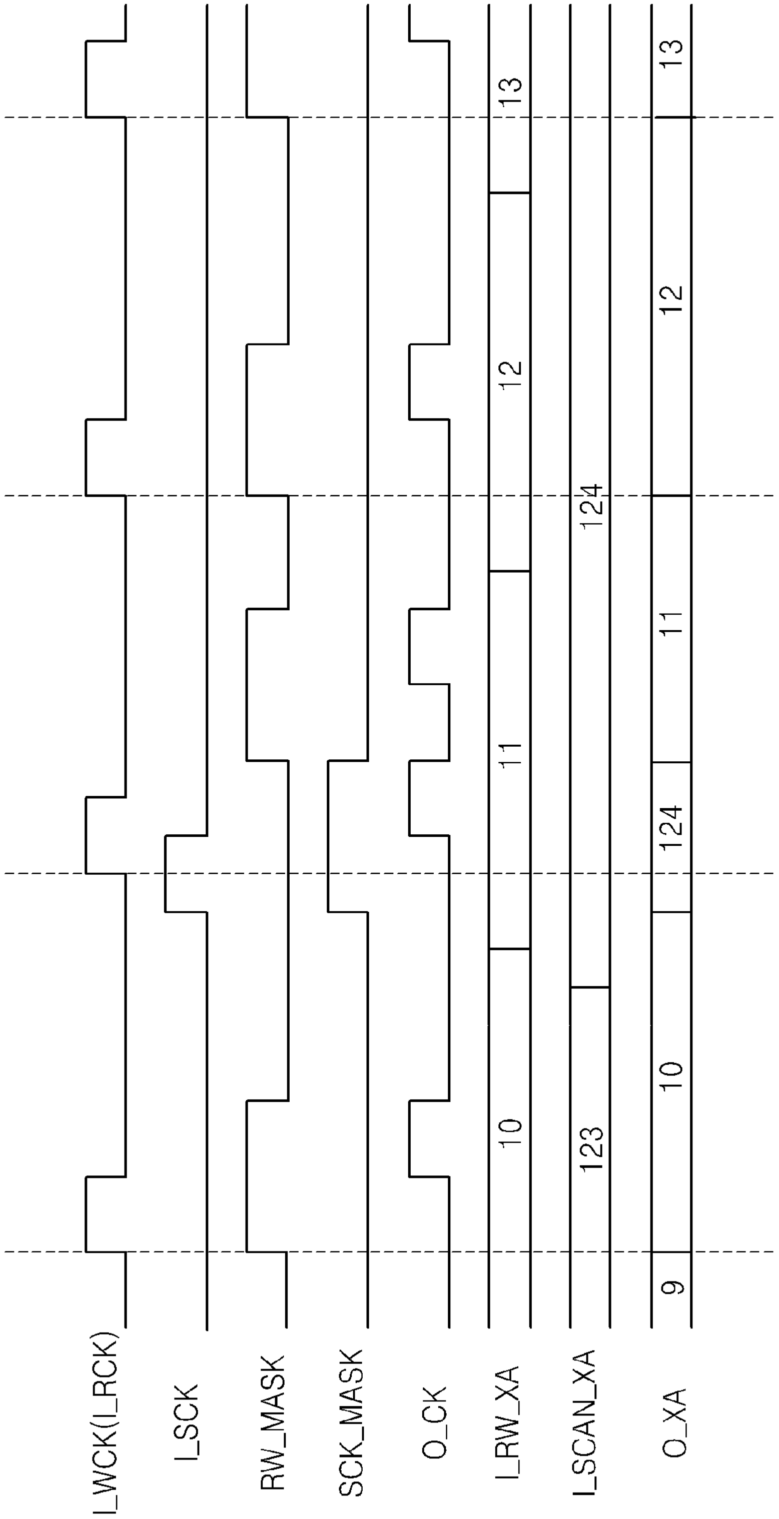
FIG. 6 is a waveform illustrating an operation of the arbitration circuit of FIG. 3 when a scan command is received and then a read/write command is received overlapping the scan command.

FIG. 6 is a waveform illustrating an operation of the arbitration circuit 130 when a scan command is received and then a read/write command is received to overlap the scan command. Referring to FIG. 6, the first clock signal I_SCK is received and then the second clock signals I_WCK/I_RCK is received to overlap the first clock signal I_SCK.

Firstly, according to the pulse of the first clock signal I_SCK, the output Q of the first flip-flop FF1 is changed from logic low to logic high and accordingly, the first internal signal SCK_MASK is changed to logic high. The information signal O_SEN and the control signal O_CK are generated in response to the activated first internal signal SCK_MASK and the multiplexer 136 selectively outputs the scan address I_SCAN_XA. Thus, the memory unit 120 starts performing a scanning operation.

Then, since the second clock signals I_WCK/I_RCK is provided to the second flip-flop FF2 before the scanning operation of the memory unit 120 is completed, the output of the second flip-flop FF2 has a logic high value. Accordingly, the output of the second flip-flop FF2 having a logic high value is provided to one input terminal of the fourth NAND gate ND4. However, since an output of the third NAND gate ND3 provided to the other input terminal of the fourth NAND gate ND4 has a logic low value, the output of the fourth NAND gate ND4 maintains logic high regardless of the output of the second flip-flop FF2. Accordingly, an output of the second inverter I2 maintains a logic low value and thus the second internal signal RW_MASK maintains a logic low value.

Then, as the scanning operation of the memory unit 120 is completed, the ready signal I_READY is provided to the arbitration circuit 130. Also, the pulse READY_PULSE generated based on the ready signal I_READY is provided to the first flip-flop FF1 and the second flip-flop FF2 and the first flip-flop FF1 performs a reset operation based on a combination of the pulse READY_PULSE and the activated first internal signal SCK_MASK. Accordingly, the output of the first flip-flop FF1 is changed to logic low.

According to the reset operation of the first flip-flop FF1, the output of the third NAND gate ND3 is changed to logic high and is provided to one input terminal of the fourth NAND gate ND4. Accordingly, the fourth NAND gate ND4 outputs a signal having a logic low value by receiving the output of the third NAND gate ND3 having a logic high value and the output of the second flip-flop FF2 having a logic high value. Thus, the second internal signal RW_MASK is changed to logic high. Accordingly, the information signal O_SEN and the control signal O_CK are generated in response to the activated second internal signal RW_MASK and the multiplexer 136 selectively outputs the read/write row address I_RW_XA. Thus, the memory unit 120 starts performing a reading/writing operation.

According to the operations of the arbitration circuit 130 above, when the scan command and the read/write command is received to overlap each other, data does not collide with each other. That is, although the second clock signals I_WCK/I_RCK is provided while the first internal signal SCK_MASK for a scanning operation is activated, the second internal signal RW_MASK is not directly activated and instead the second internal signal RW_MASK is activated in response to the ready signal I_READY, which indicates completion of the scanning operation of the memory unit 120. In other word, the first internal signal SCK_MASK and the second internal signal RW_MASK are prevented from being overlapped with each other and activated and thereby the scanning operation and the reading/writing operation are prevented from being performed at the same time in the memory unit 120.

The read/write address I_RW_XA of, for example, 10, 11, 12, and 13, may be generated, and the scan address I_SCAN_XA of, for example, 123 and 124 may be generated. And then, the output address O_XA of, for example, 9, 10, 124, 11, 12, and 13, may be generated according to corresponding ones of the read/write address I_RW_XA of 10, 11, 12, and 13 and the scan address I_SCAN_XA of 123 and 124.

Figure 7:
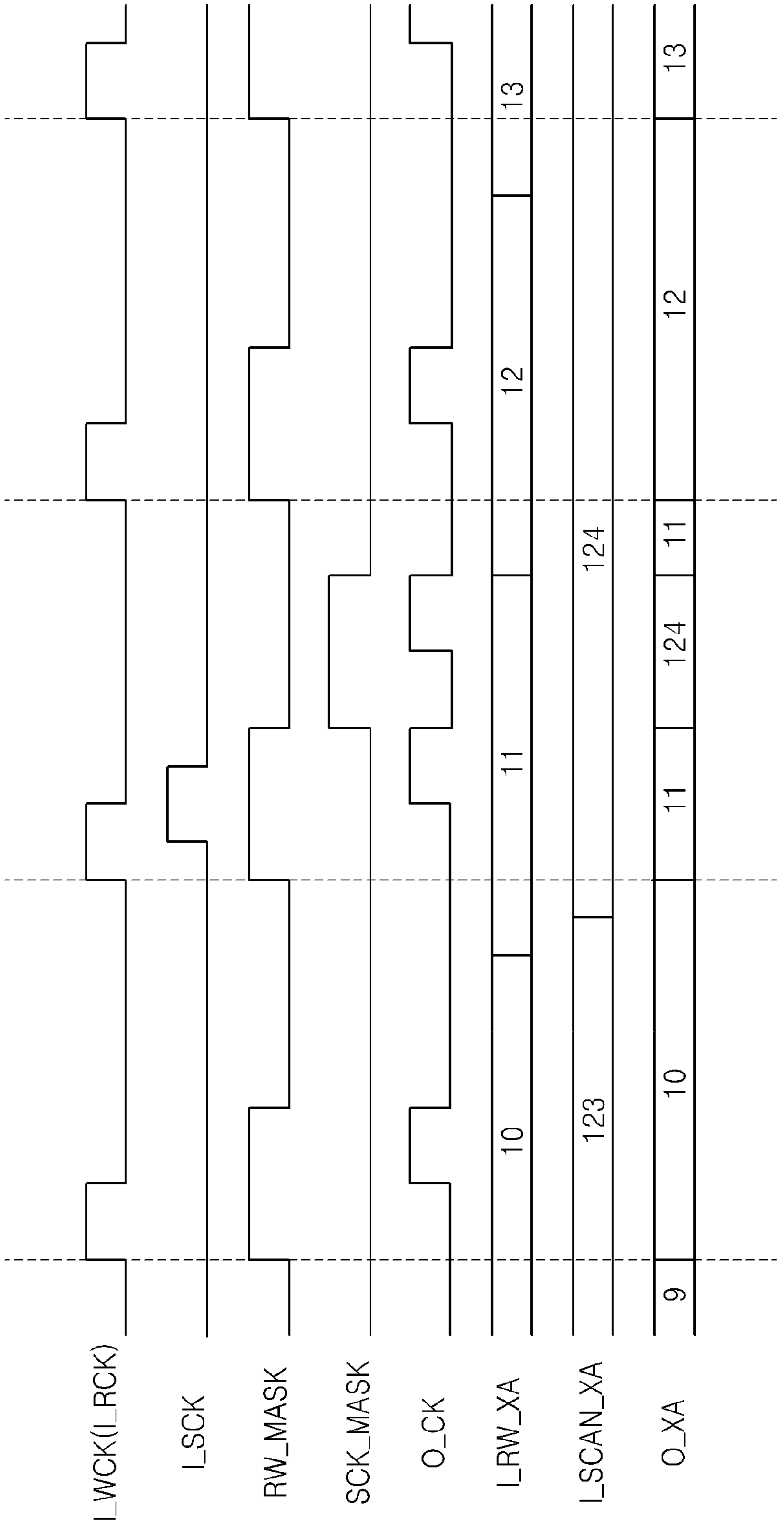
FIG. 7 is a waveform illustrating an operation of the arbitration circuit of FIG. 3 when a read/write command is received and then a scan command is received overlapping the read/write command

FIG. 7 is a waveform illustrating an operation of the arbitration circuit 130 when a read/write command is received and then a scan command is received overlapping the read/write command.

Firstly, according to the pulse of the second clock signals I_WCK/I_RCK, the output Q of the second flip-flop FF2 is changed from logic low to logic high and accordingly, the second internal signal RW_MASK is changed to logic high. The information signal O_SEN and the control signal O_CK are generated in response to the second internal signal RW_MASK and the multiplexer 136 selectively outputs the read/write row address I_RW_XA. Thus, the memory unit 120 starts performing a reading/writing operation.

Then, since the first clock signal I_SCK is provided to the first flip-flop FF1 before the reading/writing operation of the memory unit 120 is completed, the output of the first flip-flop FF1 has a logic high value. However, the third NAND gate ND3 receives a signal having a logic low value from the fourth NAND gate ND4, and thus the output of the third NAND gate ND3 maintains logic high. Accordingly, the first internal signal SCK_MASK maintains a logic low value.

Then, as the reading/writing operation of the memory unit 120 is completed, the ready signal I_READY is provided to the arbitration circuit 130 and the pulse READY_PULSE generated based on the ready signal I_READY is provided to the first flip-flop FF1 and the second flip-flop FF2. The second flip-flop FF2 performs a reset operation based on a combination of the pulse READY_PULSE and the activated second internal signal RW_MASK. Accordingly, the output of the second flip-flop FF2 is changed to logic low.

According to a change in the output of the second flip-flop FF2, the output of the fourth NAND gate ND4 is changed to logic high and is provided to one input terminal of the third NAND gate ND3. Accordingly, the third NAND gate ND3 receives signals having logic high values through two input terminals thereof and thus the output thereof is changed to logic low. According to a change in the output of the third NAND gate ND3, the first internal signal SCK_MASK is changed to logic high. Also, the information signal O_SEN and the control signal O_CK are generated in response to the activated first internal signal SCK_MASK and the multiplexer 136 selectively outputs the scan address I_SCAN_XA. Thus, the memory unit 120 starts performing a scanning operation. That is, any one of the first internal signal SCK_MASK and the second internal signal RW_MASK is selectively activated using the ready signal I_READY so that the scanning operation and the reading/writing operation are prevented from being performed at the same time in the memory unit 120.

The read/write address I_RW_XA of, for example, 10, 11, 12, and 13, may be generated, and the scan address I_SCAN_XA of, for example, 123 and 124 may be generated. And then, the output address O_XA of, for example, 9, 10, 11, 124, 11, 12, and 13, may be generated according to corresponding ones of the read/write address I_RW_XA of 10, 11, 12, and 13 and the scan address I_SCAN_XA of 123 and 124.

Figure 8:
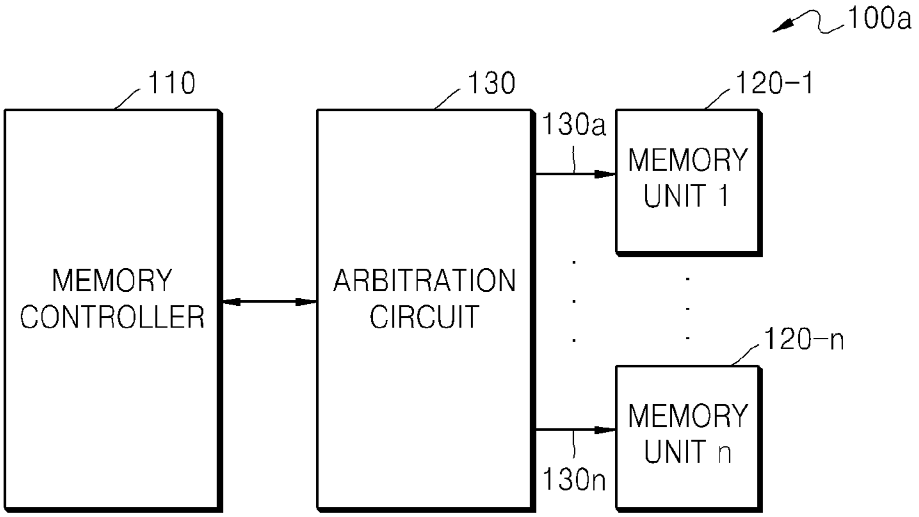
FIG. 8 is a block diagram of a display driver integrated circuit according to an embodiment of the inventive concept.

FIG. 8 is a block diagram of a display driver integrated circuit 100a according to an embodiment of the inventive concept. The display driver integrated circuit 100a may include a memory controller 110, an arbitration circuit 130, and a memory unit 120 having a plurality of memory units 120-1 . . . 120-n. Here, n is an integer and may be 2, 3, or 4. However, the present general inventive concept is not limited thereto. It is possible that n is a number higher than 4. The arbitration circuit 130 is connected to the memory units 120-1 . . . 120-n through communication lines 130a through 130n. Each of the communication lines 130a through 130n includes signals O_CSN, O_WEN, O_SEN, O_CK, O_XA, O_YA, O_DI, I_DOUT, and I_READY. The arbitration unit 130 of FIG. 8 receives the signals from the memory controller 110 and outputs the signals to the respective memory units memory units 120-1 . . . 120-n as illustrated in FIG. 1. Here, the scanning command and the read/write command are selectively generated according to the signal I_CSN and O_CSN designating the respective memory units 120-1 . . . 120-n.

The arbitration unit 130 may generate the signal O_CSN to select at least one of the memory units 120-1 . . . 120n according to the chip selection signal I_CSN to perform the scanning operation or the read/write operation. Therefore, the chip selection signal I_CSN may include a signal to designate the corresponding one of the memory units 120-1 . . . 120n, thereby selecting the memory unit 120-1 . . . or 120-n. It is possible that the arbitration unit 130 receives the chip selection signal I_CSN and then generates the chip selection signal O_CSN according to the signal I_WEN indicating the read/write command I_WEN and/or the signal I_SCK in response to the chip selection signal I_CSN such that the memory units 120-1 . . . 120n can be selected to perform the scanning operation and the read/write operation. It is possible that a first memory unit 120-1 can perform a scanning operation and a second memory unit 120-2 can perform a read/write operation. In this case, the arbitration unit can prevents a read/write operation from being performed during the scanning operation at the same time, and can also prevent a scanning operation from being performed during a read/write operation. Therefore, the arbitration unit 130 can operate and generate signals to corresponding to the respective memory units 120-1 . . . 120-n.

It is also possible that the arbitration unit 130 may have a circuit to selectively or sequentially generate signals to perform at least either one of the scanning operation and the read/write operation in the corresponding memory units 120-1 . . . 120-n. It is also possible that the circuit of the arbitration unit 130 of FIG. 8 may include a predetermined number of circuits of the arbitration unit 130 of FIG. 2 to correspond to the respective memory units 120-1 . . . 120-n.

Figure 9:
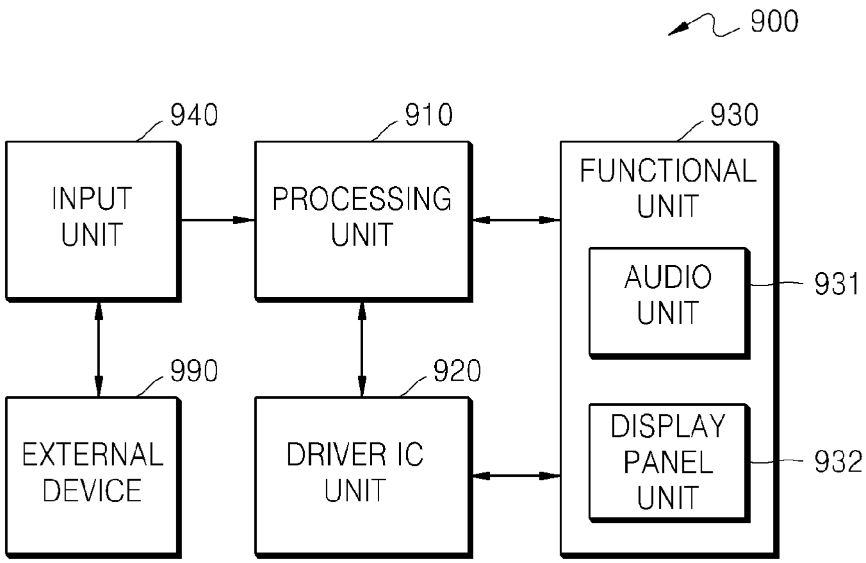
FIG. 9 is a view illustrating an electronic apparatus having a driver integrated circuit unit according to an embodiment of the present general inventive concept.

FIG. 9 is a view illustrating an electronic apparatus 900 having the display driver integrated circuit according to an embodiment of the present general inventive concept. The electronic apparatus 900 may include a processing unit 910, a driver IC unit 920, a functional unit 930 having an audio unit 931 and a display panel unit 932, and an input unit 940. The driver IC 100 of FIG. 1 can be used as the driver IC unit 920 of FIG. 920. The input unit 940 may have an input device to generate a user input and output the generated user input to the processing unit 910. The input unit 940 may generate data to be stored in the memory unit 120 of the driver IC unit 920. The input unit 940 may communicate with an external device 990 through wired or wireless communication lines to receive data to be stored in the memory unit 120 or transmit the data read from the memory unit 120 to the external device 990. The input unit can also receive signals to control the processing unit 910, the driver IC unit 920, and/or the functional unit 930.

The processing unit 910 processes the date or signal received through the driver IC unit 920 or the input unit 940. The processed data and signal can be used to perform an audio generating operation through the audio unit 931 and a video displaying operation through the display panel unit. Here, a display apparatus is illustrated as the electronic apparatus 900. However, the present general inventive concept is not limited thereto. The electronic apparatus 900 may be a mobile terminal apparatus, a wireless phone, an image display apparatus, a portable computer, an apparatus having a display panel to display an image using the data read from the memory unit 120 of the driver IC unit 920, and so on.

As described above, the arbitration unit of FIG. 3 can have a first unit, for example, the first latch circuit 131-1 and a portion of the maintaining unit 132 (third NAND gate ND3 and inverter I1), to process the signal or command for the scanning operation and a second unit, for example, the second latch circuit 131-2 and another portion of the maintaining unit 132 (fourth NAND gate ND4 and inverter I2), to process the signal or command for the read/write operation to read and/or write the data or to modify or change the data. The image displayed on a screen of the display panel may be changed according to the modified or changed data. The first unit and the second unit can hold or delay processing the signals or commands to avoid a conflict or overlap between the scanning operation and the read/write operation of the memory unit 120.

Figure 10:
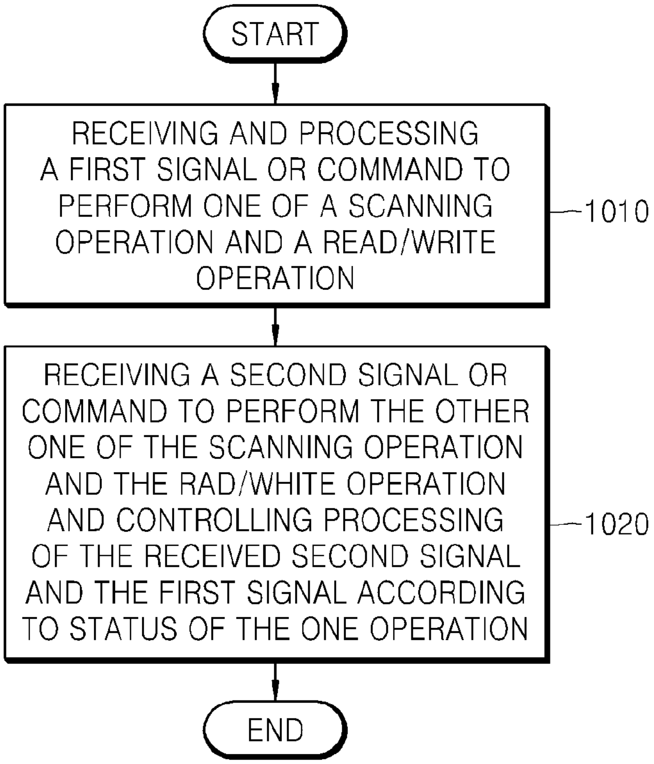
FIG. 10 is a flowchart illustrating a method of a driver IC unit usable with an electronic apparatus according to an embodiment of the present general inventive concept.

FIG. 10 is a flowchart illustrating a method of a driver IC unit usable with an electronic apparatus according to an embodiment of the present general inventive concept. Referring to FIGS. 1 through 10, the arbitration unit 130 receives a first signal or command and processes (or activate) the received first signal or command to perform one of a scanning operation and a read/write operation, and receives a second signal or command to perform the other one of the scanning operation and the read/write operation and controls the processing (or activating) of the received second signal according to status of the one of the scanning operation and the read/write operation. The arbitration unit 130 may delay or holds the second signal or command until a signal is received to indicate that the one of the scanning operation and the read/write operation is completed or finished according to the processed first signal. The arbitration unit 130 may process (deactivate) the processed first signal according to the processed second signal.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

According to the embodiments of the inventive concept, a reading/writing operation of data is available without a need to secure a separate scan section after a read/write section so that operational speed is prevented from decreasing. Also, the operation is performed based on latch and maintaining operations so that a predetermined signal delay operation for securing a read/write section and a scan section is not performed and accordingly may not be affected by PVT.

According to the inventive concept, a scanning operation and a reading/writing operation may be prevented from being performed at the same time for a memory, a decrease in operational speed of the memory may be prevented, and pressure, voltage, and/or temperature (PVT) influences on the electronic apparatus or the display driver integrated circuit may be reduced.

Although a few embodiments of the present invention have been shown and described, it would be appreciated by those skilled in the art that changes may be made in these embodiments without departing from the principles and spirit of the general inventive concept, the scope of which is defined in the claims and their equivalents.

What is claimed is:

1. An arbitration circuit usable with an electronic apparatus, comprising:

a latch unit comprising a first latch circuit that latches and outputs a first signal related to a scan command and a second latch circuit that latches and outputs a second signal related to a read/write command, wherein the latch unit resets outputs of the first latch circuit and/or the second latch circuit in response to a ready signal related to a memory operation;

a maintaining unit to receive outputs of the first latch circuit and the second latch circuit, to generate a first internal signal to activate a scanning operation and a second internal signal to activate a reading/writing operation, to maintain the first internal signal and the second internal signal, and to selectively activate the first internal signal or the second internal signal by changing the state of at least one of the first internal signal and second internal signal in response to the reset operation, an information signal generating unit to generate an information signal indicating a section of a scanning operation or a reading/writing operation of the memory in response to any one of the first internal signal and the second internal signal;

a control signal generating unit to generate a control signal in which a clock is activated in correspondence to the activation of each of the first internal signal and the second internal signal and to control the scanning operation or the reading/writing operation of the memory to be performed; and a multiplexer to receive a scan address and a read/write address and to selectively output any one address in response to the information signal wherein during a conflict of the first internal signal and the second internal signal, either signal, once activated, is maintained without interruption until completion of its respective operation.

2. The arbitration circuit of claim 1, wherein:

the first latch circuit comprises a first flip-flop that receives the first signal, generates an output signal according to the first signal, and in which a reset operation thereof is controlled according to the ready signal and the first internal signal; and the second latch circuit comprises a second flip-flop that receives the second signal, generates an output signal according to the second signal, and in which a reset operation thereof is controlled according to the ready signal and the second internal signal.

3. The arbitration circuit of claim 1, wherein:

the maintaining unit maintains the first internal signal activated and the second internal signal deactivated, and then deactivates the first internal signal and activates and outputs the second internal signal at the same time in response to the reset operation of the first latch circuit when the first signal and the second signal are sequentially provided and there is a section in which the first signal and the second signal overlap; and the maintaining unit maintains the second internal signal activated and the first internal signal deactivated, and then deactivates the second internal signal and activates and outputs the first internal signal at the same time in response to the reset operation of the second latch circuit when the second signal and the first signal are sequentially provided and there is a section in which the second signal and the first signal overlap.

4. The arbitration circuit of claim 1, further comprising:

at least one latch circuit to latch a command, an address, or data received from an external memory controller and to output the latched signal so as to be interlocked with the time for transmitting the first signal.

5. An arbitration circuit usable with an electronic apparatus, comprising:

a latch unit comprising a first latch circuit that latches and outputs a first signal related to a scan command and a second latch circuit that latches and outputs a second signal related to a read/write command, wherein the latch unit resets outputs of the first latch circuit and/or the second latch circuit in response to a ready signal related to a memory operation; and a maintaining unit to receive outputs of the first latch circuit and the second latch circuit, to generate a first internal signal to activate a scanning operation and a second internal signal to activate a reading/writing operation, to maintain the first internal signal and the second internal signal, and to selectively activate the first internal signal or the second internal signal by changing the state of at least one of the first internal signal and second internal signal in response to the reset operation, wherein the maintaining unit comprises:

a first NAND operation unit to receive the output of the first latch circuit through a first input terminal thereof and performing a NAND operation; and a second NAND operation unit to receive the output of the second latch circuit through a first input terminal thereof, to receive the output of the first NAND operation unit through a second input terminal thereof, to perform a NAND operation, and to provide the output thereof to a second input terminal of the first NAND operation unit.

6. The arbitration circuit of claim 5, wherein the maintaining unit further comprises:

a first inverter to receive and invert the output of the first NAND operation unit and to generate the first internal signal; and a second inverter to receive and invert the output of the second NAND operation unit and to generate the second internal signal.

7. A driver integrated circuit usable with an electronic apparatus, comprising:

a memory unit to store image data;

a memory controller to control a scanning operation and reading/writing operation of the memory unit; and an arbitration circuit interposed between the memory unit and the memory controller to arbitrate a conflict between a scan command and a read/write command provided from the memory controller, to receive a ready signal comprising information related to an operation of the memory unit, to selectively activate and output a first internal signal to activate a scanning operation or a second internal signal to activate a reading/writing operation in response to the ready signal, the arbitration circuit having:

a latch unit comprising a first latch circuit that latches and outputs a first signal related to a scan command and a second latch circuit that latches and outputs a second signal related to a read/write command, wherein the latch unit resets outputs of the first latch circuit and/or the second latch circuit in response to a ready signal related to a memory operation;

a maintaining unit to receive outputs of the first latch circuit and the second latch circuit, to generate the first internal signal to activate the scanning operation and the second internal signal to activate the reading/writing operation, to maintain the first internal signal and the second internal signal, and to selectively activate the first internal signal or the second internal signal by changing the state of at least one of the first internal signal and second internal signal in response to the reset operation, an information signal generating unit to generate an information signal indicating a section of a scanning operation or a reading/writing operation of the memory in response to any one of the first internal signal and the second internal signal;

a control signal generating unit to generate a control signal in which a clock is activated in correspondence to the activation of each of the first internal signal and the second internal signal and to control the scanning operation or the reading/writing operation of the memory to be performed; and a multiplexer to receive a scan address and a read/write address and to selectively output any one address in response to the information signal, wherein during a conflict of the first internal signal and the second internal signal, either signal, once activated, is maintained without interruption until completion of its respective operation.

8. The display driver integrated circuit of claim 7, wherein:

the maintaining unit maintains the first internal signal activated and the second internal signal deactivated, and then deactivates the first internal signal and activates and outputs the second internal signal at the same time in response to the reset operation of the first latch circuit when the first signal and the second signal are sequentially provided and there is a section in which the first signal and the second signal overlap; and the maintaining unit maintains the second internal signal activated and the first internal signal deactivated, and then deactivates the second internal signal and activates and outputs the first internal signal at the same time in response to the reset operation of the second latch circuit when the second signal and the first signal are sequentially provided and there is a section in which the second signal and the first signal overlap.

9. An electronic apparatus comprising:

a functional unit to perform a displaying operation to display an image on a screen thereof using data; and a driver integrated circuit to control the functional unit, and comprising:

a memory unit to store the data;

a memory controller to control a scanning operation and a reading/writing operation of the memory unit; and an arbitration unit interposed between the memory unit and the memory controller to arbitrate a conflict between a scan command and a read/write command provided from the memory controller, to receive a ready signal comprising information related to an operation of the memory unit, to selectively activate and output a first internal signal to activate a scanning operation or a second internal signal to activate a reading/writing operation in response to the ready signal, the arbitration circuit having:

a latch unit comprising a first latch circuit that latches and outputs a first signal related to a scan command and a second latch circuit that latches and outputs a second signal related to a read/write command, wherein the latch unit resets outputs of the first latch circuit and/or the second latch circuit in response to a ready signal related to a memory operation;

a maintaining unit to receive outputs of the first latch circuit and the second latch circuit, to generate the first internal signal to activate the scanning operation and the second internal signal to activate the reading/writing operation, to maintain the first internal signal and the second internal signal, and to selectively activate the first internal signal or the second internal signal by changing the state of at least one of the first internal signal and second internal signal in response to the reset operation, an information signal generating unit to generate an information signal indicating a section of a scanning operation or a reading/writing operation of the memory in response to any one of the first internal signal and the second internal signal;

a control signal generating unit to generate a control signal in which a clock is activated in correspondence to the activation of each of the first internal signal and the second internal signal and to control the scanning operation or the reading/writing operation of the memory to be performed; and a multiplexer to receive a scan address and a read/write address and to selectively output any one address in response to the information signal, wherein during a conflict of the first internal signal and the second internal signal, either signal, once activated, is maintained without interruption until completion of its respective operation.

10. The electronic apparatus of claim 9, wherein the functional unit comprises a display panel having the screen to display an image according to the data scanned from the memory unit during the scanning operation.

11. The electronic apparatus of claim 9, wherein the functional unit comprises a display panel having the screen to display an image according to the data written in the memory unit during the read/write operation.

12. The electronic apparatus of claim 9, wherein the arbitration unit processes the scan command and the read/write command to avoid an overlap between the scanning operation and the read/write operation of the memory unit, and one of the scanning operation and the read/write operation is not interrupted according to one of the scan command and the read/write command.

13. The electronic apparatus of claim 12, wherein the arbitration unit holds the processing of one of the scan command and the read/write command such that the scanning operation and the read/write operation do not overlap in the memory unit.

14. The electronic apparatus of claim 9, wherein the arbitration unit delays the activation of the second internal signal until the scanning operation has been performed in the memory unit according to the first internal signal.

15. An arbitration unit usable with a driving unit having a memory unit and a memory controller in an electronic apparatus, comprising:

a latch unit to receive a first signal to perform one of a scanning operation and a read/write operation on the memory unit, and to receive a second signal to perform the other one of the scanning operation and the read/write operation on the memory unit during performing the one of the scanning operation and the read/write operation, and to delay processing of the second signal until the one of the scanning operation and the read/write operation of the memory unit has been finished according to the first signal regardless of which operation the first signal corresponds to.

16. An arbitration unit usable with a driving unit having a memory unit and a memory controller in an electronic apparatus, comprising:

a first unit to process a first signal to perform a scanning operation to scan data of the memory unit; and a second unit to prevent a second signal from being processed to perform a read/write operation to write data in the memory unit when the scanning operation is performed according to the first signal.

17. A driver IC unit usable with an electronic apparatus having a functional unit to display an image according to data, comprising:

a memory unit to store the data; and an arbitration unit to control the memory unit to scan the data of the memory unit in a scanning operation and to read/write the data in the memory unit in a read/write operation, to process a first signal to perform one of the scanning operation and the read/write operation on the memory unit, and to delay processing of a second signal to perform the other one of the scanning operation and the read/write operation until the one of the scanning operation and the read/write operation has been finished according to the processed first signal regardless of which operation the first signal corresponds to.

18. A method of driving a driver IC unit usable with an electronic apparatus having a functional unit to display an image according to data, the method comprising:

storing the data in a memory unit; and controlling the memory unit to scan the data of the memory unit in a scanning operation and to read/write the data in the memory unit in a read/write operation, processing a first signal to perform one of the scanning operation and the read/write operation on the memory unit, and delaying the processing of a second signal to perform the other one of the scanning operation and the read/write operation until the one of the scanning operation and the read/write operation has been finished according to the processed first signal regardless of which operation the first signal corresponds to.

19. A non-transitory computer-readable medium having executable programming instructions stored thereon to perform a method of driving a driver IC unit usable with an electronic apparatus having a functional unit to display an image according to data, the method comprising:

storing the data in a memory unit; and controlling the memory unit to scan the data of the memory unit in a scanning operation and to read/write the data in the memory unit in a read/write operation, processing a first signal to perform one of the scanning operation and the read/write operation on the memory unit, and delaying the processing of a second signal to perform the other one of the scanning operation and the read/write operation until the one of the scanning operation and the read/write operation has been finished according to the processed first signal regardless of which operation the first signal corresponds to.

* * * * *